United States Patent [19]

Palm

[11] Patent Number: 5,429,459
[45] Date of Patent: Jul. 4, 1995

[54] METHOD OF AND APPARATUS FOR THREAD MILL DRILLING

[75] Inventor: Edward B. Palm, Warren, Mich.

[73] Assignee: Manuel C. Turchan, Dearborn, Mich.

[21] Appl. No.: 705,921

[22] Filed: May 28, 1991

Related U.S. Application Data

[63] Continuation of Ser. No. 2,227, Jan. 12, 1987, abandoned, which is a continuation-in-part of Ser. No. 839,054, Mar. 13, 1986, abandoned.

[51] Int. Cl.$^6$ .......................... B13C 3/00; B23G 5/20
[52] U.S. Cl. ........................... 409/66; 408/222;
   409/74; 470/198; 470/199
[58] Field of Search .................... 409/65–76;
   408/222, 22, 30, 59, 218, 219, 220, 221, 224;
   72/70, 71, 112, 1.4, 118, 120, 126; 407/20, 24,
   29, 54, 58, 59, 61, 63

[56] References Cited

U.S. PATENT DOCUMENTS

| | | | |
|---|---|---|---|
| 637,640 | 11/1899 | Mitchell | 408/150 |
| 1,162,441 | 11/1915 | Bloss | 408/187 X |
| 1,836,954 | 12/1931 | Bryant | 408/34 |
| 2,042,782 | 6/1936 | Hall | 29/DIG. 83 |
| 2,461,947 | 2/1949 | Weber | 408/72 X |
| 3,167,260 | 1/1965 | Gibbons et al. | 409/137 X |
| 3,621,754 | 11/1971 | Ditson | 409/74 |
| 3,857,305 | 12/1974 | Lichtman | 407/55 |
| 4,011,792 | 3/1977 | Davis | 409/137 |
| 4,487,275 | 12/1984 | Froehlich | 408/150 |
| 4,620,822 | 11/1986 | Hague et al. | 408/224 |

*Primary Examiner*—William Briggs
*Attorney, Agent, or Firm*—Remy J. VanOphem; John VanOphem

[57] ABSTRACT

A threaded hole (20) in a workpiece (22) is formed by rapidly spinning an elongated tool (24) having a drill point (64) at one end, at least one longitudinally extending flute (80) having thread milling faces (84) for milling the thread to be formed, and wherein the tool (24) is first moved axially to carry the drill point (64) against and into the workpiece (22) to form a hole (66), then is displaced radially a distance equal to the thread depth to be formed, then is moved orbitally around the hole (66) to mill threads therein, then is displaced back to the center of the hole (20) and then is retracted from the hole (20). To form a helical thread in the hole (20), the tool (24) is shifted axially one thread pitch during the orbital movement. A thread milling drill head (26) is disclosed for chucking the tool (24) and shifting it through the aforesaid movements. Fluid flow may be induced into the hole (66a) to entrain the waste or fines and carry such out of the hole, and for this purpose a passageway (100) connects to a source (111) of fluid pressure with a turbine blade assembly (110) mounted on the tool (24a).

31 Claims, 6 Drawing Sheets

METHOD OF AND APPARATUS FOR THREAD MILL DRILLING

CROSS REFERENCE TO RELATED APPLICATION

This is a continuation, of application Ser. No. 07/002,227, filed Jan. 12, 1987, abandoned which is a continuation-in-part of Ser. No. 06/839,054, filed Mar. 13, 1986, abandoned.

BACKGROUND OF THE INVENTION

1. Field of the Invention

This invention relates to methods and apparatus for thread mill drilling wherein a single tool is manipulated to first drill a hole in a workpiece and thereafter moved orbitally in the hole to form threads in the wall of the hole and then retracted from the hole.

2. Description of the Prior Art

The common approach to providing a threaded hole in a workpiece is to first drill the hole using a drill bit or the like and after removing the bit from the hole, using a tap, to tap the hole to provide threads in the wall thereof. In lieu of a tap, a thread milling tool may be used. Thread milling has only been satisfactory in larger diameter holes such as ⅜ or ½, and has been too slow for smaller holes. U.S. Pat. No. 2,813,280 shows a combination drill and tap, but I am not aware that this has met with commercial success.

Substantial savings in processing costs could be effected if, instead of requiring the use of separate drilling and tapping or milling tools, the same tool could be used for the entire operation because such would avoid the necessity of indexing the workpiece from one forming operation to another, or using a machine tool having separate heads for moving the drilling and tapping or milling tools successively into work performing positions. U.S. Pat. No. 3,334,366 shows a machine tool having a spindle intended to hold either a drill or a tap, but the drill must be removed before the tap may be mounted in the spindle.

SUMMARY OF THE INVENTION

According to my invention, the same tool is used both for drilling the hole in the workpiece and then milling threads in the wall of the hole. Thus, substantial savings in production time are possible and production costs reduced. The tool for performing this operation, which I have termed a thread milling drill, has an elongated shank having a drill point or drilling face at one end, and along the side is provided with thread milling surfaces. In operation, the tool is rotated and shifted axially to bring its drill point against the workpiece, and a hole is bored in the workpiece. Then the axis of rotation of the tool is shifted laterally by a distance equal to at least the depth of the thread to be milled to move the thread milling surfaces into contact with the wall of the hole and position the milling surfaces to effect the thread milling operation. The axis of rotation of the tool is then moved orbitally 360 degrees around the wall of the hole while the tool is simultaneously shifted axially one thread pitch. This serves to mill threads in the wall of the hole. The axis of rotation is then shifted back to the center of the hole and the tool is retracted from the hole.

In a preferred embodiment the tool is rotated at a high speed viz., in excess of 15,000 R.P.M. and preferably on the order of 30,000 R.P.M. The drill point and thread milling faces may be formed of various materials. For example, when thread mill drilling plastic compositions such as composites of KEVLAR ®, glass-fibers, carbon fibers or the like in a binder of epoxy resin or the like, the drilling and milling faces are preferably formed of polycrystalline diamond or polycrystalline cubic boron nitride. For thread mill drilling in ferrous materials, a ceramic surface may be provided, while in thread mill drilling cast iron, silicon nitride or carbide may be used.

The thread milling drill tool is mounted in a chuck carried by a high speed spindle which is supported for axial shifting toward and away from a workpiece and for lateral displacement and orbital movement to effect the thread milling. In a production environment the spindle is preferably part of a thread milling drill head which is supported in a machine tool for positioning in relation to a succession of workpieces that are presented to the head for boring and thread milling. Movements of the chuck carried by the thread milling drill head are preferably under computer control.

During the thread mill drilling operation the hole in the workpiece is simultaneously purged so that the waste materials being removed do not clog the hole and impede operation of the tool. For this purpose, fluid is introduced into the hole to displace the waste axially along the tool and out of the hole. In the disclosed embodiment, the thread and mill drill is provided with fluid passageway means for delivering fluid under pressure to the hole adjacent the cutting surfaces and as the fluid escapes from the hole it carries the fines or waste with it. The tool may be provided with turbine blade means arranged to closely overlie the opening of the hole around the tool for creating a partial vacuum at the mouth of the hole to induce the fluid pressure flow and remove the fines from the hole.

DETAILED DESCRIPTION OF THE PREFERRED EMBODIMENT

Figure 1:
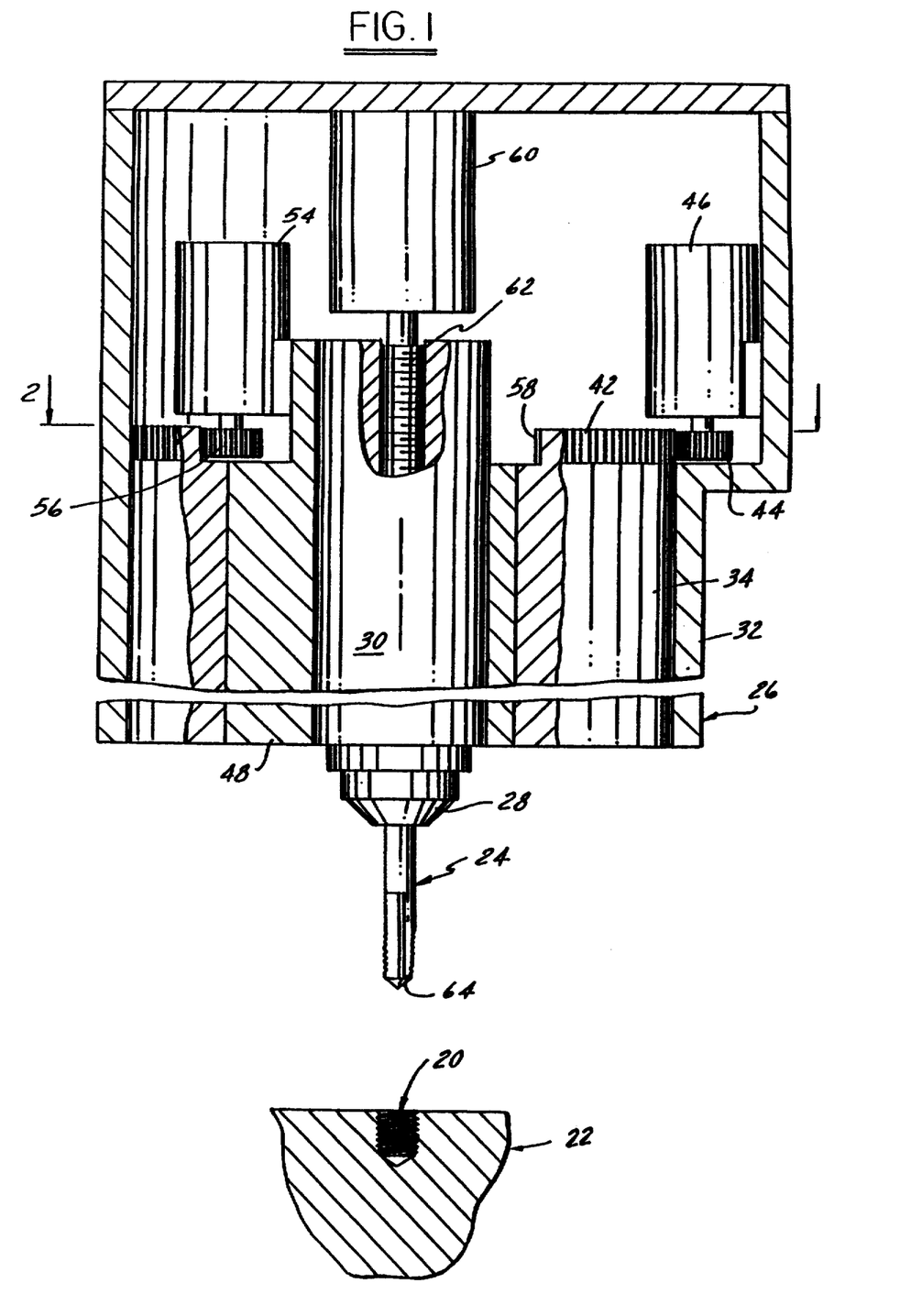
FIG. 1 is a schematic vertical sectional view through a thread milling drill head embodying my invention showing a thread milling drill tool therein with a work piece therebelow which has been provided with a threaded bore through the use of the apparatus.

As shown in FIG. 1 a threaded hole or bore 20 in a workpiece 22 is formed by a tool 24 which I have termed a thread milling drill. This tool is mounted in a thread milling drill head 26 having the capability of:

(1) Rotating the tool at a high frequency such as 15,000 RPM or greater;
(2) Shifting the tool axially toward the workpiece 22 to drill a hole therein;
(3) Displacing the center of rotation of the tool laterally the depth of the threads to be milled;
(4) Moving the tool 24 in an oribital path through 360 degrees while simultaneously moving it axially one-thread pitch thereby milling threads in the hole in the workpiece; and
(5) Displacing the center of rotation of the tool back to the center of the hole and retracting the tool therefrom.

The aforesaid movements of the tool 24 was carried by the thread milling drill head 26 are made possible by mounting the tool 24 in a chuck 28 carried by a high-speed spindle 30. Such a spindle is of the type made by Fortuna Werke Maschinenfabrik GmbH, and sold in the U.S.A. by Russell T. Gilman, Inc., 624 Beech Street, Geofton, Wis. Other spindle manufacturers are:

Bryant Grinder Corporation, Springfield, Vt.;

The Precise Corporation, 3715 Blue River Ave., Racine, Wis..

The spindle carries the chuck and the tool 24 so that the latter projects from an end of the head 26 as shown in FIG. 1. Spindle speed should be at least 15,000 R.P.M. and preferably on the order of 30,000 R.P.M.

Figure 2:
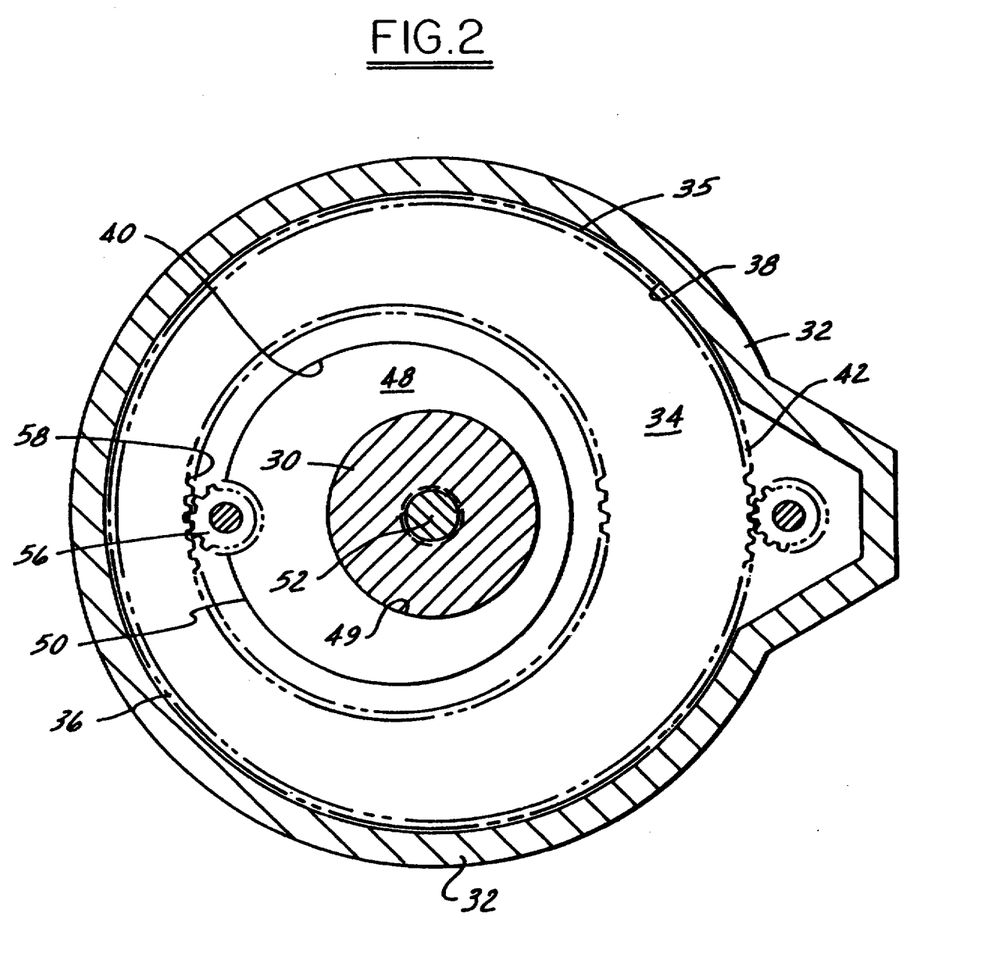
FIG. 2 is a cross sectional view taken on the line 2—2 of FIG. 1.

Various arrangements for supporting the spindle may be provided and I have shown schematically one arrangement that will effect the requisite movements. Other arrangements will occur to those skilled in the art. In the schematic arrangement shown, the thread milling drill head 26 includes a housing 32 within which the spindle 30 is mounted. The spindle is carried by an outer orbital ring 34 having a cylindrical periphery 35 carried by the inner cylindrical surface 38 of the housing 32. The outer orbital ring has an internal periphery 40 eccentric to its outer periphery 36 as best shown in FIG. 2. A ring gear 42 on the outer orbital ring meshes with a pinion gear 44 on the drive shaft of an electric positioning motor 46 which is secured to the housing 32 whereby operation of the motor will drive the outer orbital ring 34 either clockwise or counterclockwise as desired. The positioning motor 46 may be of the kind manufactured by Portescap U.S., 2550 Eisenhower Avenue, Valley Forge, Pa. under model NO. P-530. In lieu of the meshing ring and pinion gears, timing belt type drives between the motor and ring 34 may be used.

Within the eccentric inner periphery 40 of the orbital ring 34 is mounted a spindle displacement ring 48, having a spindle receiving opening 49 which is eccentric to its outer surface 50 and in which is mounted the high-frequency spindle 30. The spindle 30 is mounted in a position eccentric to the outer surface or 50 of the spindle displacement ring so that when the displacement ring is rotated within the orbital ring 34 to the position shown in FIG. 2 the center or axis of rotation 52 of the spindle is coincident with the center or axis of rotation of the orbital ring 34, i.e., coincident with the center of the outer periphery 36.

A second positioning motor 54 is mounted on the spindle displacement ring 48 and is provided with a pinion 56 which meshes with an internal ring gear 58 on the outer orbital ring 34. The second positioning motor 54 may be of the same type as the motor 46. Upon operation of the second positioning motor 54, the spindle displacement ring is rotated within the orbital ring 34 to displace laterally the axis of rotation 52 of the spindle 30. Such displacement serves to shift the tool 24 laterally. It will be appreciated that such displacement may occur while the tool 24 is rotating at the high speed provided by the spindle 30. Thus, the tool 24 may be displaced laterally upon operation of the second positioning motor 54 the depth of the thread to be formed.

Upon completing the displacement of the tool 24 laterally to the depth of the thread to be formed, energization of the motor 46 will cause rotation of the orbital ring 34 whereby the axis 52 of the spindle and in turn the tool 24 may be rotated through an orbit of 360 degrees to carry the tool 24 around the inside of the bore 20. The radius of such orbit is, of course, the amount of lateral displacement of the axis 52 of the spindle from the axis of the hole. In practice the hole 20 will be drilled with the spindle axis centered on the center of the outer cylindrical periphery 35 of the outer orbital ring, and then the spindle axis will be displaced laterally from this position for the thread milling operation.

Simultaneously with the orbital movement of the spindle and tool, it is necessary to shift the tool axially one-thread pitch in order to mill helical threads in the bore 20. Such axial movement of the spindle is accomplished by a positioning motor 60 connected to the housing 32 and having a threaded shaft 62 which engages with the spindle as schematically shown in FIG. 1. Upon energization of the motor 60 to turn its shaft in one direction the spindle 30 may be shifted axially outwardly of the housing 32, or upon reverse energization of the motor 60 the spindle may be retracted away from the workpiece.

The housing 32 of the thread milling drill head 26 may be mounted as a unit in a suitable machine tool capable of moving the head into position to operate on a succession of workpieces, such as in a production environment. Such machine tool is not shown as it may be of various configurations which will be apparent to one of ordinary skill in the art.

The positioning motors 46, 54, and 60 are desirably under the control of a computer programmed to carry out the motions of the tool 24 as herein described and more particularly as follows. Referring to FIGS. 3–6 inclusive, the tool 24 rotating at a high frequency is fed axially along its axis of rotation by motor 60 to bring a drill point end 64 against the workpiece 22 and as the tool continues to move toward the workpiece the drill point will drill a smooth wall cylindrical hole or bore 66 therein whose diameter corresponds substantially to the root diameter of the threads to be formed in the hole.

Figure 3:
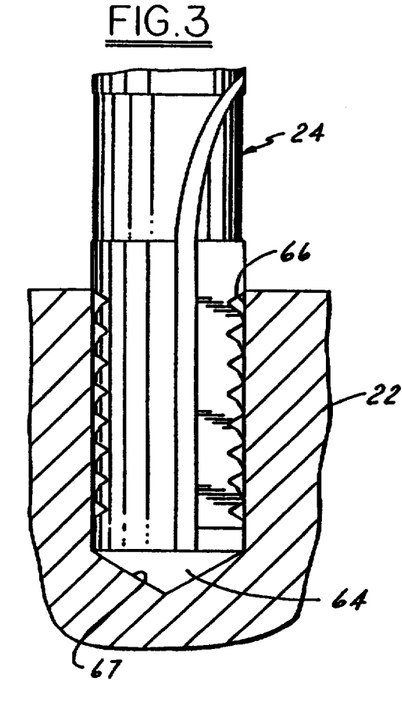
FIG. 3 is a vertical elevation of the thread milling drill tool as it is drilling a hole in a workpiece.

Thus, the first operation performed by the tool 24 is to drill the hole 66 in the workpiece.

Figure 4:
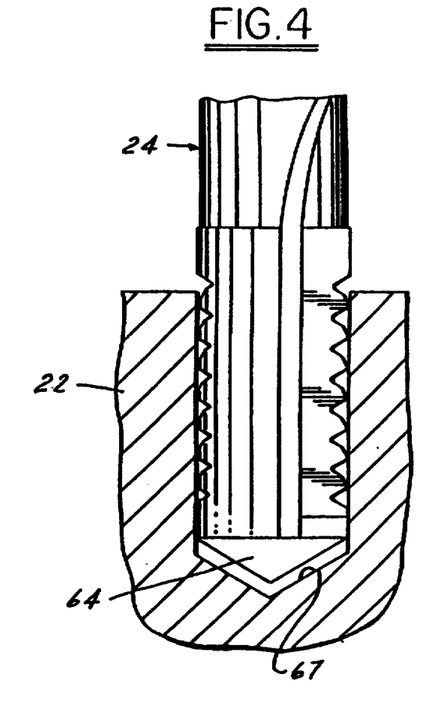
FIG. 4 shows the thread milling drill tool retracted slightly from the bottom of the hole preparatory to the thread milling operation.

The second step, which may be optional in certain cases, is to retract the tool 24 at least one-thread pitch away from the bottom of the hole and such is shown after the retraction has occurred in FIG. 4 where the point 64 is shown spaced from the bottom 67 of the hole by one-thread pitch. Whether this step is needed may depend upon the speed of rotation of the thread milling drill, the type of material of the workpiece, and other factors dependent upon the particular situation at hand.

The third step in the thread mill drilling method is to displace the center of rotation of the tool 24 laterally a distance equal to the depth of the thread to be formed. Such is carried out while the tool 24 is rotating at high speed and following such displacement the position of the tool relative to the bore 66 is as shown in FIG. 5 where the tool has been shown displaced to the left such that the milling surfaces of the thread profile are embedded in the wall of the bore 66 to commence formation of the thread profile in the bore.

Figure 5:
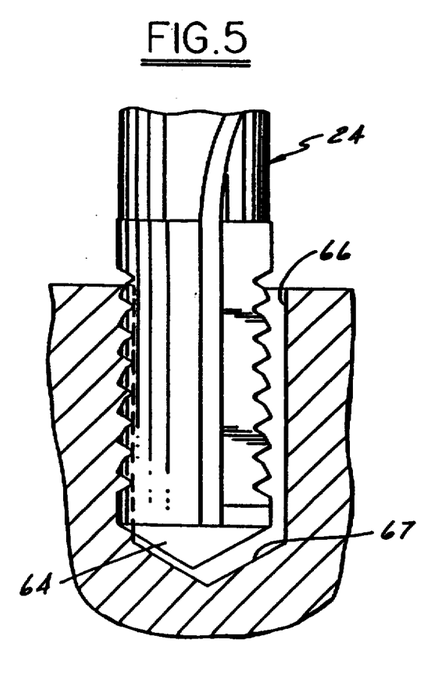
FIG. 5 shows the thread milling drill tool of FIGS. 3 and 4 displaced laterally by the thread depth of the thread milling profile preparatory to the thread milling operation.
Figure 6:
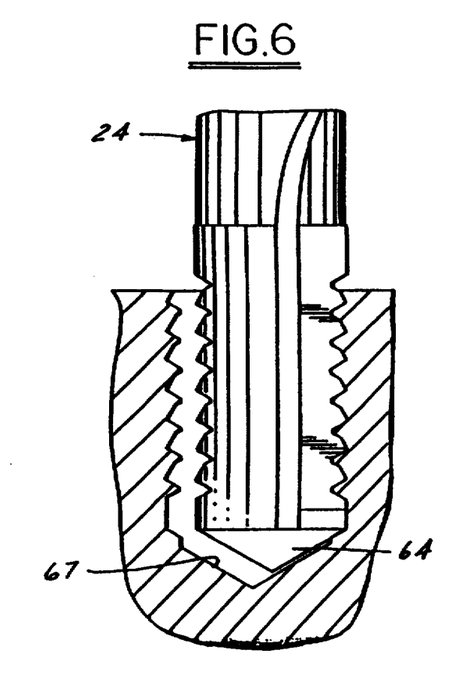
FIG. 6 shows the thread milling drill tool of FIGS. 3 and 4 during the thread milling operation.

The next step in the thread mill drilling method is to cause the tool 24 to orbit through 360 degrees around the inside of the bore 66 following a path in which the center of rotation of the tool 24 follows an orbital path whose radius from the center of the hole is equal to the displacement effected in FIG. 5. If it is desired to form helical threads in the bore, it is necessary simultaneously with such orbiting movement to shift the tool 24 axially a distance equal to the thread pitch. Such shifting is carried out at a uniform rate corresponding to the orbital movement of the tool 24 so that the helix angle of the thread is uniform around its periphery. In FIG. 6 I have shown the tool 24 having completed substantially 180 degrees of its orbital movement and it has been shifted axially through substantially one-half of a thread pitch toward the bottom 67 of the hole. If it is desired to form annular threads (without a helix angle), the thread milling drill is not shifted axially during its orbital movement.

After the tool 24 has completed a 360 degree orbit it is displaced laterally to bring its center of rotation back into coincidence with the centerline of the hole in the workpiece and then the tool is retracted from the hole leaving the threads formed therein. It is contemplated that the entire operation of drilling the hole and milling the threads and retracting the tool from the hole may be a matter of but a few seconds, or a fraction thereof.

As will be appreciated by those of ordinary skill in the art, the control of the thread mill drill head to carry out the foregoing movements may be readily placed under the control of a programmable computer whereby feed rates, lateral displacement, depth of hole, and the like may be varied in accordance with the size of the screw thread to be formed and the material of the workpiece.

The thread milling drill 24 is shown in greater detail in FIGS. 7–11. The tool includes a shank 68 having a chuck engaging portion 70 at one end for reception in the chuck 28 for mounting the tool in the thread milling drill head. At the opposite end of the tool is the drill point 64 having cutting edges 72 and 74 and lower trailing edges 76 and 78.

Figures 7, 8, 9:
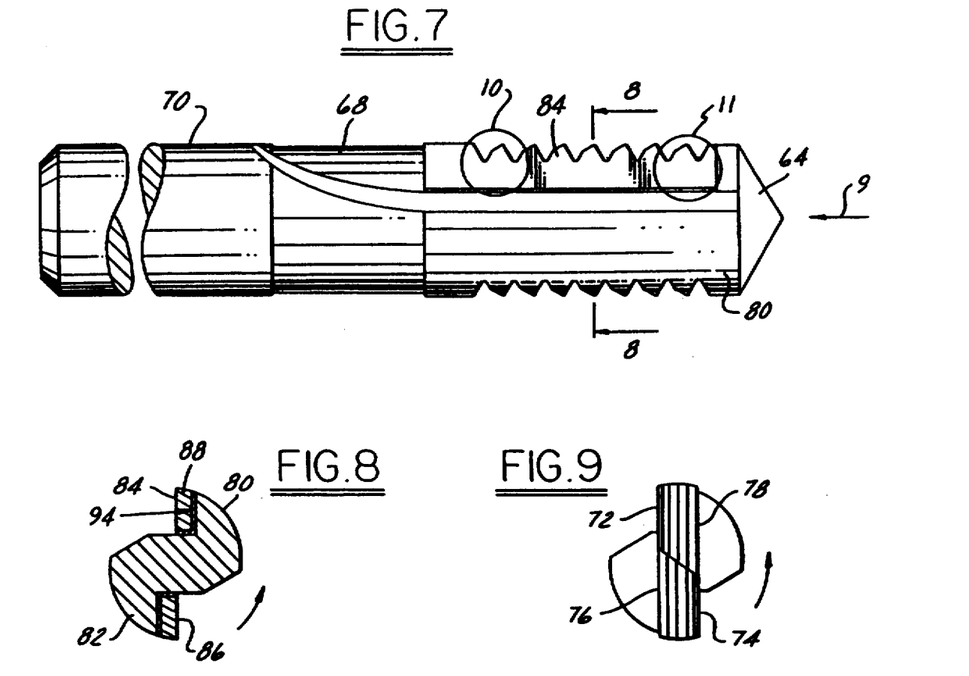
FIG. 7 is a side elevation of a thread milling drill tool usable in the thread milling drill method.
FIG. 8 is a cross sectional view taken on a line 8—8 of FIG. 7.
FIG. 9 is an end view of the thread milling drill tool of FIG. 7 looking at the drill point in the direction of arrow 9 in FIG. 7.

The side of the shank is provided with a thread profile constituting a plurality of flutes arranged around the axis of the shank in a symmetrical configuration. In the embodiment shown two such flutes are provided at 80 and 82. Each of the flutes has a thread profile which may be of any desired thread configuration. In the embodiment shown the profile is that of a thread-locking form described in U.S. Pat. No. 4,023,914 and marketed under the trademark SPIRALOCK ®. The teaching of U.S. Pat. No. 4,023,914 is incorporated herein by reference.

Each of the flutes is preferably provided with cutting or milling faces 84 and 86 made of a material harder than that of the shank. In a preferred embodiment the surfaces are formed of a composite of natural or synthetic polycrystalline diamond and or polycrystalline cubic boron nitride. Such will be particularly satisfactory for use in boring and thread milling composite workpieces formed of carbon fibers, KEVLAR ®, glass fibers and the like in various resin binders such as epoxy or the like resins, or in any other workpiece material which is particularly abrasive. Polycrystalline cutting surfaces suitable for this purpose may be of the type described in U.S. Pat. Nos. 4,241,135; 4,242,106; and 4,247,304 which are incorporated herein by reference, but the composite is not limited to these teachings. For drilling and thread milling cast iron, the work surfaces of the thread milling drill are preferably faced with a silicon nitride or carbide, and when drilling and thread forming in ferrous materials such as steel, a ceramic surface may be used.

Figure 10:
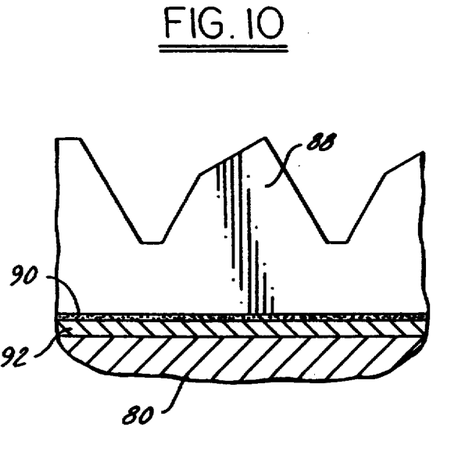
FIGS. 10 and 11 are enlarged fragmentary views through the thread milling faces of the thread milling drill tool of FIG. 7 taken substantially in the areas 10 and 11 of FIG. 7.
Figure 11:
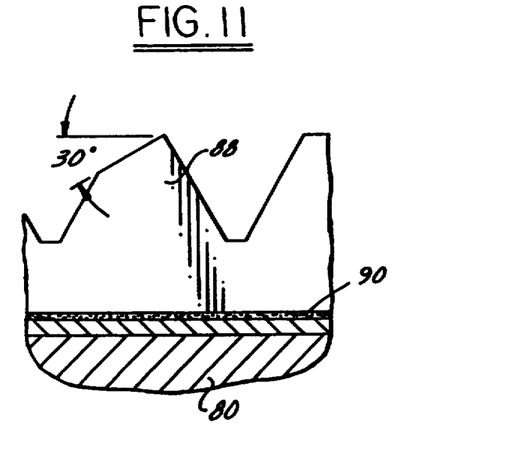

Polycrystalline diamond and or cubic boron nitride composite is shown in FIG. 8, 10, and 11 at 88 and may be secured to the flutes in any suitable fashion. For example, but without limitation, the composite may be provided with a metallic backing 90 by which the composite may be secured through a brazing layer 92 to the flute 80. The adhering layer is generally indicated in FIG. 8 at 94. The center of mass of the thread milling drill should lie substantially on its intended axis of rotation to minimize dynamic unbalance at high rotational speeds.

It will be understood that whether the thread formed in the workpiece is left-hand or right-hand will depend upon the direction of orbital movement of the thread milling drill and the direction of its axial shifting. For example, a clockwise orbital movement will give a left-hand thread if the thread milling drill is simultaneously shifted axially in one direction, but a right-hand thread if the axial shifting is in the opposite direction.

Figure 12:
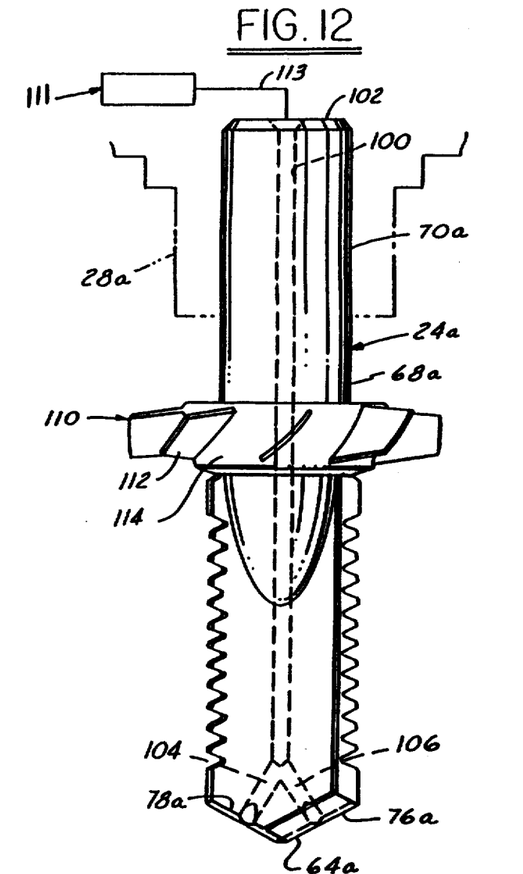
FIG. 12 is a side view of a thread mill drill having a fluid passageway therethrough for introducing fluid pressure into the hole to carry the fines therefrom.
Figure 13:
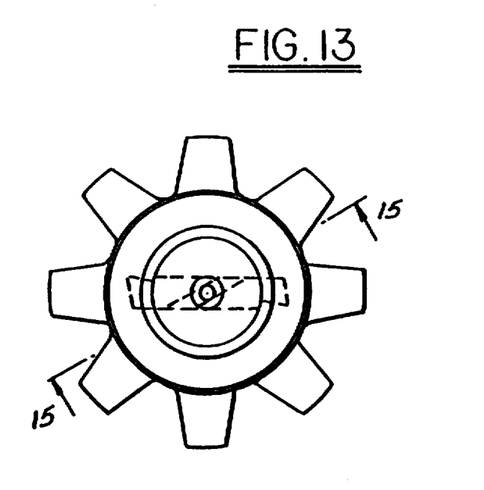
FIG. 13 is an end view of the top of the thread mill drill shown in FIG. 12.
Figure 14:
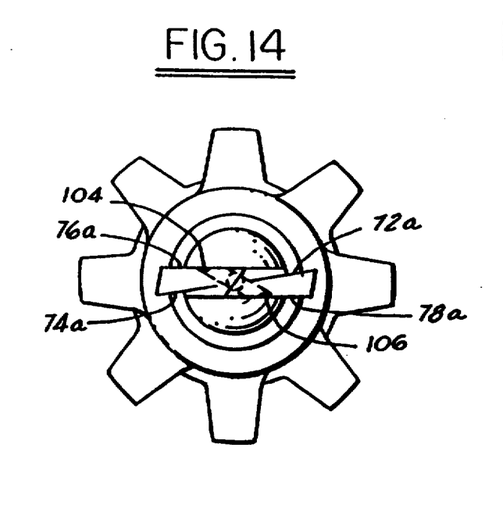
FIG. 14 is an end view of the bottom of the thread mill drill shown in FIG. 12.
Figure 15:
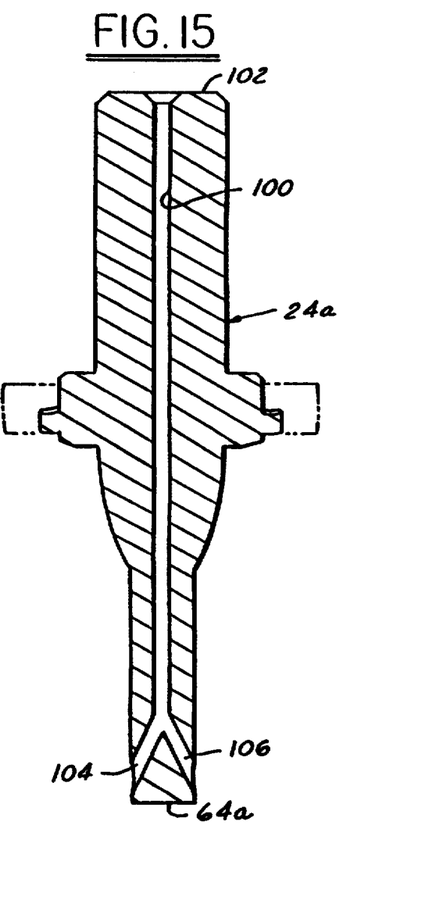
FIG. 15 is a cross-sectional view taken on line 15—15 of FIG. 13.

In FIGS. 12–15 there is shown a modified form of the thread mill drill designed to induce a fluid flow into the hole within which the tool is working which will entrain the waste or fines created by the tool and carry such out of the mouth of the hole around the tool. To create the fluid flow a longitudinal fluid pressure passageway 100 extends coaxially along the tool from its upper end 102 toward the lower drill point end 64a. Just short of the drill point end the passageway 100 divides into branches 104 and 106 which open through the drill point end behind lower trailing edges 76a and 78a as shown in FIGS. 12, 14 and 15.

Fluid under pressure is introduced into the passageway 100 at the upper end of the tool and flows down through it to the cutting or lower drill point end 64a and thence passes back up the hole and out of the mouth thereof around the cutter. This fluid flow, in the embodiment shown, is induced by a source of fluid pressure 111 schematically shown in FIG. 12 which is connected by a fluid pressure line 113 to the upper end of the passageway 100. A turbine 110 mounted on the shank portion 68a adjacent the upper end of the, cutting portion and just below the chuck engaging portion has comprises a series of radially extending blades 112. The blades may be formed on an annulus 114 which is slipped dozen over the shank portions 68a and 70a and thereafter locked upon the shank of the cutter. The inclination of the blades is such as to induce a partial vacuum at the mouth of the hole within which the cutter is operating and in the embodiment shown the blades are designed to induce a partial vacuum upon clockwise or right-hand rotation of the tool. In some instances it may be desirable to completely eliminate the turbine 110 and rely solely upon the introduction of fluid pressure at the upper end of the passageway 100, from the source 111 or the turbine 110 may be used in association therewith.

Figures 16, 17:
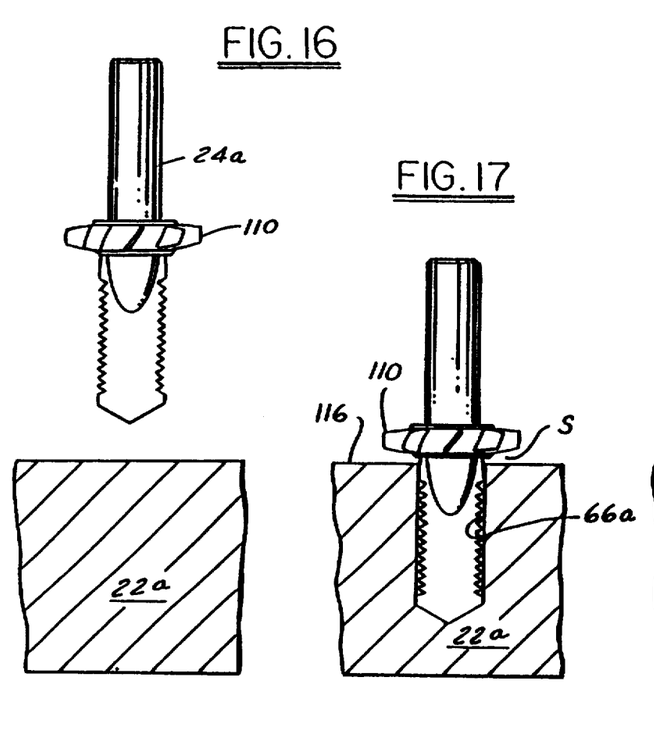
FIGS. 16–21 show the steps in thread mill drilling utilizing the tool of FIG. 12.

FIGS. 16–21 show the tool 24a in various stages of movement to effect the thread mill drilling operation. In FIG. 16 the tool is poised above a workpiece 22a. The thread milling drill head is not shown in FIGS. 16–21 but it will be understood that the tool 24a is carried thereby.

In FIG. 17 the tool 24a has been moved axially into the workpiece to drill the hole 66a therein. As the turbine 110 approaches an upper surface 116 of the work piece 22a, the air space "S" between the turbine and the surface 116 decreases until the turbine blades are disposed closely adjacent the surface and at such point cooperate therewith to effectively form a vacuum chamber adjacent the mouth of the bore 66a whereby a vacuum is created within the bore assisting to induce the fluid flow through the passageway 100, as previously described in conjunction with FIGS. 12-15, whereby the fines or waste created by the cutter as it moves into the workpiece are carried out of the hole through the mouth thereof around the tool.

Figure 18:
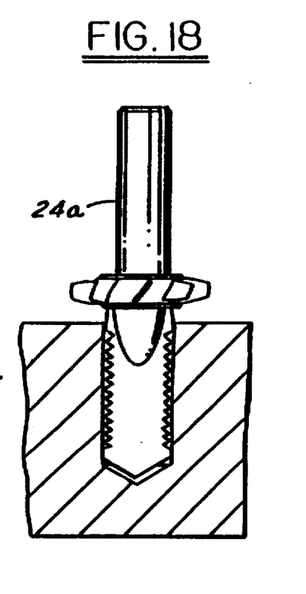
Figure 19:
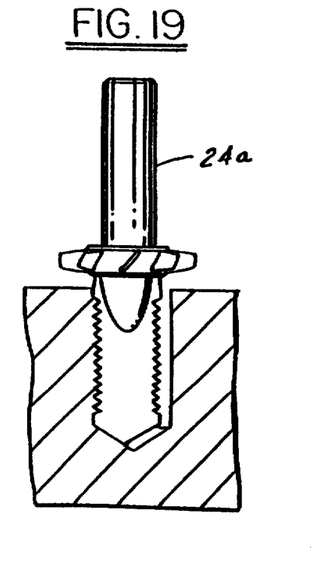
Figure 20:
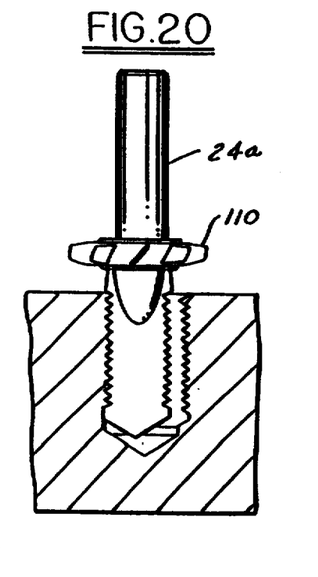
Figure 21:
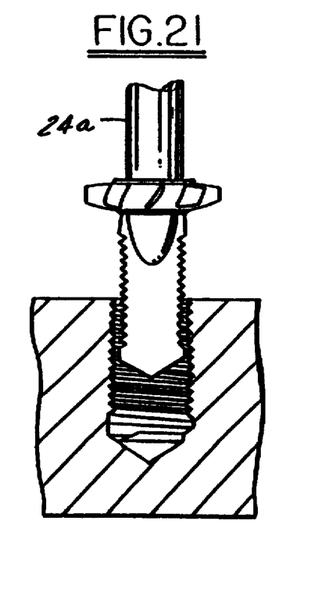

In FIG. 18, the tool has been retracted one thread pitch. In FIG. 19, the tool has been displaced radially one thread diameter in preparation for its orbital movement around the hole. Following the thread milling the tool is moved back to the center of the hole and withdrawn as shown in FIG. 21 until it reaches its starting position of FIG. 16.

What is claimed is:

1. A hole making and grooving tool for use in a machine tool which is adapted to simultaneously rotate a cutting tool about its axis and feed said cutting tool axially for cutting a hole in an imperforate surface of a solid portion of a workpiece and thereafter concurrently move said axis axially and orbitally to form a groove in the wall of said hole, said hole making and grooving tool comprising:
   an elongated straight body having a shank at one end;
   a hole making means at the other end for making said hole in said imperforate surface of said solid portion of said workpiece, said hole having a wall; and a groove making means intermediate said ends; and
   at least one chip removal passage extending from said hole making means through said groove making means;
   said groove making means having a maximum diameter which is no greater than the maximum diameter of said hole making means whereby said groove making means can enter said hole made by said hole making means in said imperforate surface of said solid portion of said workpiece without interference with said wall of said hole and while remaining in said hole form said groove in said wall.

2. The tool as claimed in claim 1 wherein said hole making means is a drill.

3. The tool as claimed in claim 1 wherein said groove making means is a groove form cutter.

4. The tool as claimed in claim 1 wherein said hole making means is a drill form.

5. The tool as claimed in claim 1 wherein said hole making means comprises a drill point, and said groove making means comprises a groove form having a plurality of groove cutters.

6. The tool as claimed in claim 1 wherein said hole making means comprises a drill point; and said groove making means comprises a groove form cutter having a plurality of groove cutters.

7. A hole making and grooving tool for use in a machine tool which is adapted to simultaneously rotate a cutting tool about its axis and feed said cutting tool axially for cutting a hole in an imperforate surface of a solid portion of a workpiece and thereafter concurrently move said axis axially and orbitally to form a groove in said wall of said hole, said hole making and grooving tool comprising:
   an elongated body having a shank at one end adapted to be held by said machine tool;
   a hole cutter at the other end for making said hole in said imperforate surface of said solid portion of said workpiece, said hole having a wall;
   an axially extending groove form mill intermediate said shank and said hole cutter; and
   at least one chip removal passage extending from said hole cuter through said groove form mill;
   said groove form mill having a maximum diameter no greater than the maximum diameter of said hole cutter whereby said groove form mill can enter said hole made by said hole cutter in said imperforate surface of said solid portion of said workpiece without interference with said wall of said hole and while remaining in said hole form said groove in said wall.

8. A method of making a grooved hole in an imperforate surface of a solid portion of a workpiece comprising the steps of:
   providing an elongated tool having an axis of rotation, a hole making means at one end and a groove making means on the side thereof;
   rotating said tool about said axis of rotation while shifting it axially to move said hole making means against and into said imperforate surface of said solid portion of said workpiece to form a hole therein, said hole having a wall;
   while rotating said tool, moving said axis of rotation orbitally around said hole to mill at least one annular groove in said wall of said hole;
   displacing said axis of rotation back to the center of said hole; and
   retracting said tool from said hole.

9. The method as claimed in claim 8 wherein said axis of rotation of said tool is displaced radially during oribital movement around said hole a distance equal to the groove depth to be formed in said wall of said hole.

10. The method as claimed in claim 9 including the step of retracting said tool from the bottom of said hole after Forming said hole and before orbiting said axis of rotation.

11. The method as claimed in claim 8 wherein said axis of rotation or said tool is moved orbitally through at least 360 degrees around said hole.

12. The method as claimed in claim 8 further comprising the step of introducing a fluid under pressure into a central passage in said tool, said central passage having an exit adjacent the bottom of said tool such that said fluid flows along the outer periphery of said tool toward the mouth of said hole to scavenge waste material from said hole.

13. The method as claimed in claim 2 including the step of creating a partial vacuum at the mouth of said hole around said tool to draw fluid pressure introduced at the bottom of said hole outwardly thereof.

14. The method as claimed in claim 2 wherein said fluid is a gas.

15. A method of making a grooved hole in an imperforate surface of a solid portion of a workpiece comprising the steps of:
   providing an elongated tool having an axis of rotation, a hole making means at one end and a groove making means on the side thereof;
   rotating said tool about said axis of rotation while shifting it axially to move said hole making means against and into said imperforate surface of said solid portion of said workpiece to form a hole therein, said hole having a wall;
   while continuing to rotate said tool, displacing said axis of rotation radially a distance equal to the groove depth to be formed in said wall of said hole;
   while continuing to rotate said tool, moving it orbitally around said hole at least 360 degrees to form at least one annular groove in said wall of said hole;
   displacing said tool radially back to the center of said hole; and
   retracting said tool from said hole.

16. The method as claimed in claim 15 wherein subsequent to forming said hole but prior to displacing said axis of rotation radially a distance equal to the groove depth to be formed, said tool is retracted from the bottom of said hole a predetermined distance.

17. The method as claimed in claim 8 wherein prior to said orbital movement of said tool it is axially shifted in a direction toward the bottom or said hole.

18. The method as claimed in claim 15 wherein prior to said orbital movement of said tool it is axially shifted in a direction out of said hole.

19. The method as claimed in claim 15 further comprising the step of introducing a fluid under pressure into a central passage in said tool, said central passage having an exit adjacent the bottom of said tool such that said fluid flows along the outer periphery of said tool toward the mouth of said hole to scavenge waste material from said hole.

20. The method as claimed in claim 15 wherein said tool is symmetrical with respect to a longitudinal axis which is substantially coincident with said axis of rotation.

21. A groove mill drill tool for making at least one grooved hole in an imperforate surface of a solid portion of a workpiece comprising:
   an elongated shank adapted to be engaged at one end for rotation and manipulation, said groove mill drill tool having a drill point at the other end for drilling a hole in said imperforate surface of said solid portion of said workpiece as said groove mill drill tool is rotated and manipulated longitudinally into said imperforate surface of said solid portion of said workpiece, said hole having a wall therein;
   at least one longitudinally extending flute on said elongated shank; and
   at least one groove milling face on said at least one longitudinally extending flute, said at least one groove milling face having a groove profile for milling said at least one groove in said wall of said hole in said imperforate surface of said solid portion of said workpiece, said at least one groove milling face having a maximum diameter which is no greater than the maximum diameter of said drill point, wherein said groove milling face can enter said hole without interference with said wall of said hole.

22. The groove mill drill tool as claimed in claim 21 wherein there are a plurality of flutes along said elongated shank; and wherein said shank is symmetrical about a longitudinal axis and the longitudinal center of mass substantially coincides with such longitudinal axis.

23. The groove mill drill tool as claimed in claim 21 or 22 wherein said at least one groove milling face and said drill point are provided with a surface including materials selected from the group consisting of a polycrystalline diamond, polycrystalline cubic boron nitride, ceramics and silicon nitride.

24. The groove mill drill tool as claimed in claim 21 further comprising means defining a fluid passageway extending axially along said elongated shank for communication at said one end with a source of fluid pressure and opening outwardly of said elongated shank at said drill point to deliver fluid to said holeless workpiece such as to scavenge waste material from said hole within which said groove mill drill tool is operating.

25. The groove mill drill tool as claimed in claim 21 wherein said fluid passageway opens at said other end of said elongated shank for delivering fluid adjacent said drill point into said hole in said holeless workpiece.

26. The groove mill drill tool as claimed in claim 24 wherein blade means are provided on said elongated shank for creating a partial vacuum at the mouth of said hole within which said groove mill drill tool is operating.

27. The groove mill drill tool as claimed in claim 24 wherein a plurality of blades extend radially from said elongated shank between said one end and said at least one longitudinally extending flute and inclined to the axis of said elongated shank to create a vacuum at the mouth of said hole within which said groove mill drill tool is operating.

28. A hole making and grooving tool for use in a machine tool which is adapted to simultaneously rotate a cutting tool about its axis, move said cutting tool axially to form a hole in an imperforate surface of a solid portion of a workpiece without interference with the wall of said hole, and thereafter concurrently move said axis axially and orbitally to form a groove, said tool comprising:
   a body having a shank at one end, a hole making means at the other end for making said hole in said imperforate surface of said solid portion of said workpiece; said hole having a wall; and a groove making means intermediate said one end and said other end, said groove making means having a maximum diameter which is no greater than the maximum diameter of said hole making means whereby said groove making means can enter the hole made by said hole making means in said imperforate surface of said solid portion of said workpiece without interference with said wall of said hole, and while remaining in said hole form a groove in said wall, said hole making means comprising a hole cutter.

29. The tool as claimed in claim 28 wherein said hole cutter has a drill point.

30. A hole making and grooving tool for use in a machine tool which is adapted to simultaneously rotate a cutting tool about its axis, move said tool axially to form a hole in an imperforate surface of a solid portion of a workpiece, move said cutting tool radially, and thereafter concurrently move said axis axially and orbitally to form a groove, said tool comprising:

a body having a shank at one end, a hole making means at an other end for making said hole in said imperforate surface of said solid portion of said workpiece, said hole having a wall, a groove making means intermediate said one end and said other end; and said groove making means having a maximum diameter which is no greater than the maximum diameter of said hole making means whereby said groove making means can enter said hole made by said hole making means in said imperforate surface of said solid portion of said workpiece without interference with said wall of said hole and while remaining in said hole form said groove in said wall.

31. A hole making and grooving tool for use in a machine tool which is adapted to simultaneously rotate a cutting tool about its axis, move said cutting tool axially to form a hole in an imperforate surface of a solid portion of a workpiece and thereafter move said axis in an orbital path, said tool comprising:

a body having a shank at one end, a hole making means for making a hole, having a wall, in said imperforate surface of said solid portion of said workpiece comprising a drill form at an other end and a groove making means intermediate said one end and said other end whereby said groove making means can enter said hole made by said drill form in said imperforate surface of said solid portion of said workpiece without interference with said wall of said hole and while remaining in said hole form a groove in said wall of said hole.

* * * * *

UNITED STATES PATENT AND TRADEMARK OFFICE
CERTIFICATE OF CORRECTION

PATENT NO. : 5,429,459          Page 1 of 2
DATED     : July 4, 1995
INVENTOR(S) : Edward B. Palm It is certified that error appears in the above-indentified patent and that said Letters Patent is hereby corrected as shown below:

Column 2, line 42, delete "work" insert ---- work- ----.

Column 3, line 32, delete "was" insert ---- as ----.

Column 4, line 4, after "or" insert ---- periphery ----.

Column 4, line 63, before "motor" insert ---- the ----.

Column 6, line 67, delete ---- , ----.

Column 7, line 1, delete ---- comprises ----.

Column 7, line 3, delete "dozen" insert ---- down ----.

Column 8, line 31, delete "cuter" insert ---- cutter ----.

Column 8, line 59, delete "oribi-" insert ---- orbi- ----.

Column 8, line 64, delete "Forming" insert ---- forming ----.

Column 8, line 67, delete "or" insert ---- of ----.

Column 9, line 8, delete "2" insert ---- 12 ----.

Column 9, line 12, delete "2" insert ---- 12 ----.

UNITED STATES PATENT AND TRADEMARK OFFICE
CERTIFICATE OF CORRECTION

PATENT NO. : 5,429,459
DATED : July 27, 1995
INVENTOR(S) : Edward B. Palm

It is certified that error appears in the above-indentified patent and that said Letters Patent is hereby corrected as shown below:

```
Column 9, line 41, delete "or" insert ---- of ----.

Column 10, line 9, delete "wherein" insert ---- whereby ----.

Column 10, line 14, after "said" insert ---- elongated ----.

Column 10, line 31, delete "21" insert ---- 24 ----.

Column 10, line 64, delete "the" insert ---- said ----.
```

Signed and Sealed this

Seventeenth Day of November, 1998

Attest:

BRUCE LEHMAN

*Attesting Officer*      *Commissioner of Patents and Trademarks*